(12) United States Patent
Borleske

(10) Patent No.: US 7,495,578 B2
(45) Date of Patent: Feb. 24, 2009

(54) MULTIPURPOSE INTERFACE FOR AN AUTOMATED METER READING DEVICE

(75) Inventor: Andrew J. Borleske, Garner, NC (US)

(73) Assignee: Elster Electricity, LLC, Raleigh, NC (US)

( * ) Notice: Subject to any disclaimer, the term of this patent is extended or adjusted under 35 U.S.C. 154(b) by 546 days.

(21) Appl. No.: 11/219,554

(22) Filed: Sep. 2, 2005

(65) Prior Publication Data

US 2007/0063868 A1 Mar. 22, 2007

(51) Int. Cl.
*G08C 15/06* (2006.01)

(52) U.S. Cl. .......................... 340/870.02; 340/870.01; 340/870.03; 340/825.08; 340/539; 702/61; 702/68

(58) Field of Classification Search ............ 340/870.02, 340/870.01, 825.08, 539; 702/61, 68
See application file for complete search history.

(56) References Cited

U.S. PATENT DOCUMENTS

| | | | |
|---|---|---|---|
| 3,445,815 A | 5/1969 | Saltzberg et al. ............. 340/163 |
| 3,858,212 A | 12/1974 | Tompkins et al. ...... 343/100 CS |
| 3,878,512 A | 4/1975 | Kobayashi et al. ....... 340/168 R |
| 3,973,240 A | 8/1976 | Fong ........................... 340/151 |
| 4,031,513 A | 6/1977 | Simciak .................... 340/152 T |
| 4,056,107 A | 11/1977 | Todd et al. ..................... 130/27 |
| 4,066,964 A | 1/1978 | Costanza et al. ............... 325/55 |
| 4,132,981 A | 1/1979 | White ......................... 340/203 |
| 4,190,800 A | 2/1980 | Kelly, Jr. et al. ............... 325/37 |
| 4,204,195 A | 5/1980 | Bogacki ...................... 340/151 |
| 4,218,737 A | 8/1980 | Buscher et al. ............. 364/493 |
| 4,250,489 A | 2/1981 | Dudash et al. .............. 340/147 |
| 4,254,472 A | 3/1981 | Juengel et al. .............. 364/900 |
| 4,319,358 A | 3/1982 | Sepp ............................. 375/1 |
| 4,321,582 A | 3/1982 | Banghart ..................... 340/310 |
| 4,322,842 A | 3/1982 | Martinez ..................... 370/204 |
| 4,328,581 A | 5/1982 | Harmon et al. ................. 371/8 |
| 4,361,851 A | 11/1982 | Asip et al. ...................... 358/84 |
| 4,361,890 A | 11/1982 | Green, Jr. et al. ............... 375/1 |
| 4,396,915 A | 8/1983 | Farnsworth et al. ..... 340/870.03 |
| 4,405,829 A | 9/1983 | Rivest et al. ............. 178/22.14 |

(Continued)

FOREIGN PATENT DOCUMENTS

CH 682196 A5 7/1993

(Continued)

OTHER PUBLICATIONS

Desbonnet, Joe et al., "System Architecture and Implementation of CEBus/Internet Gateway", *IEEE*, 1997, 1057-1062.

(Continued)

*Primary Examiner*—Davetta W. Goins
*Assistant Examiner*—Sisay Yacob
(74) *Attorney, Agent, or Firm*—Woodcock Washburn LLP

(57) ABSTRACT

An improved automated meter reading (AMR) device includes only a single electrical connection rather than multiple electrical connections, thereby reducing potential paths of exposure to natural elements. The AMR device monitors the single electrical connection to detect when a programming device is connected to the AMR device. When such a programming device is connected, the AMR device operates in a slave mode that enables the AMR device to be configured for interacting with a particular type of meter. The slave mode may also enable testing of various features of the AMR device such as, for example, its data transmitting capabilities. When the AMR device is not connected to a programming device, the AMR device operates in a master mode that enables the AMR device to interact with a connected meter in accordance with the AMR device's configuration.

20 Claims, 4 Drawing Sheets

U.S. PATENT DOCUMENTS

| | | | |
|---|---|---|---|
| 4,415,896 A | 11/1983 | Allgood | 340/870.03 |
| 4,466,001 A | 8/1984 | Moore et al. | 340/825.08 |
| 4,485,439 A | 11/1984 | Rothstein | 364/200 |
| 4,500,933 A | 2/1985 | Chan | 360/69 |
| 4,504,831 A | 3/1985 | Jahr et al. | 340/870.03 |
| 4,506,386 A | 3/1985 | Ichikawa et al. | 455/343 |
| 4,513,415 A | 4/1985 | Martinez | 370/92 |
| 4,525,861 A | 6/1985 | Freeburg | 455/33 |
| 4,600,923 A | 7/1986 | Hicks et al. | 340/870.02 |
| 4,608,699 A | 8/1986 | Batlivala et al. | 375/216 |
| 4,611,333 A | 9/1986 | McCallister et al. | 375/1 |
| 4,614,945 A | 9/1986 | Brunius et al. | 340/870.03 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.18 |
| 4,638,298 A | 1/1987 | Spiro | 340/827 |
| 4,644,321 A | 2/1987 | Kennon | 340/310 |
| 4,653,076 A | 3/1987 | Jerrim et al. | 375/115 |
| 4,672,555 A | 6/1987 | Hart et al. | 700/276 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrickson et al. | 340/870.31 |
| 4,734,680 A | 3/1988 | Gehman et al. | 340/539 |
| 4,749,992 A | 6/1988 | Fitzmeyer et al. | 340/870.02 |
| 4,749,992 A | 6/1988 | Fitzmeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swarztrauber et al. | 364/483 |
| 4,792,946 A | 12/1988 | Mayo | 370/338 |
| 4,799,059 A | 1/1989 | Grindahl et al. | 340/870.03 |
| 4,804,938 A | 2/1989 | Rouse et al. | 340/310 |
| 4,804,957 A | 2/1989 | Selph et al. | 340/870.03 |
| 4,827,514 A | 5/1989 | Ziolko et al. | 380/48 |
| 4,833,618 A | 5/1989 | Verna et al. | 364/483 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,922,518 A | 5/1990 | Gordon et al. | 379/57 |
| 4,939,726 A | 7/1990 | Flammer et al. | 370/94.1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 5,018,165 A | 5/1991 | Sohner et al. | 375/1 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/870.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,086,292 A | 2/1992 | Johnson et al. | 340/637 |
| 5,086,385 A | 2/1992 | Launey | 364/188 |
| 5,090,024 A | 2/1992 | Vander Mey et al. | 375/1 |
| 5,111,479 A | 5/1992 | Akazawa | 375/1 |
| 5,115,433 A | 5/1992 | Baran et al. | 370/94.3 |
| 5,115,448 A | 5/1992 | Mori | 375/1 |
| 5,129,096 A | 7/1992 | Burns | 455/18 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/370.02 |
| 5,197,095 A | 3/1993 | Bonnet | 379/107 |
| 5,204,877 A | 4/1993 | Endo et al. | 375/1 |
| 5,214,587 A | 5/1993 | Green | 364/464.04 |
| 5,214,761 A | 5/1993 | Barrett et al. | 395/275 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.1 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,295,154 A | 3/1994 | Meier et al. | 375/1 |
| 5,307,349 A | 4/1994 | Shloss et al. | 370/85.2 |
| 5,311,541 A | 5/1994 | Sanderford, Jr. | 375/1 |
| 5,311,542 A | 5/1994 | Eder | 375/1 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,377,222 A | 12/1994 | Sanderford, Jr. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,408,617 A | 4/1995 | Yoshida | 395/325 |
| 5,416,917 A | 5/1995 | Adair et al. | 395/500 |
| 5,420,799 A | 5/1995 | Peterson et al. | 364/483 |
| 5,428,636 A | 6/1995 | Meier | 375/202 |
| 5,430,759 A | 7/1995 | Yokev et al. | 375/202 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,230 A | 9/1995 | Schanker et al. | 340/870.03 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,569 A | 10/1995 | Sherman et al. | 340/825.02 |
| 5,455,822 A | 10/1995 | Dixon et al. | 370/18 |
| 5,457,713 A | 10/1995 | Sanderford, Jr. et al. | 375/206 |
| 5,461,558 A | 10/1995 | Patsiokas et al. | 364/145 |
| 5,463,657 A | 10/1995 | Rice | 375/200 |
| 5,473,322 A | 12/1995 | Carney | 340/870.02 |
| 5,475,742 A | 12/1995 | Gilbert | 379/106 |
| 5,475,867 A | 12/1995 | Blum | 455/53.1 |
| 5,479,442 A | 12/1995 | Yamamoto | 375/206 |
| 5,481,259 A | 1/1996 | Bane | 340/870.03 |
| 5,488,608 A | 1/1996 | Flammer, III | 370/85.13 |
| 5,491,473 A | 2/1996 | Gilbert | 340/870.01 |
| 5,493,287 A | 2/1996 | Bane | 340/825.52 |
| 5,495,239 A | 2/1996 | Ouellette | 340/870.02 |
| 5,497,424 A | 3/1996 | Vanderpool | 380/34 |

| Patent No. | Date | Inventor | Class |
|---|---|---|---|
| 5,499,243 A | 3/1996 | Hall | 370/85.8 |
| 5,500,871 A | 3/1996 | Kato et al. | 375/208 |
| 5,511,188 A | 4/1996 | Pascucci et al. | 395/600 |
| 5,519,388 A | 5/1996 | Adair, Jr. | 340/870.02 |
| 5,521,910 A | 5/1996 | Matthews | 370/54 |
| 5,522,044 A | 5/1996 | Pascucci et al. | 395/200.06 |
| 5,524,253 A | 6/1996 | Pham et al. | 395/800 |
| 5,524,280 A | 6/1996 | Douthitt et al. | 455/62 |
| 5,525,898 A | 6/1996 | Lee, Jr. et al. | 324/142 |
| 5,526,389 A | 6/1996 | Buell et al. | 375/200 |
| 5,528,507 A | 6/1996 | McNamara et al. | 364/483 |
| 5,528,597 A | 6/1996 | Gerszberg et al. | 370/95.3 |
| 5,539,775 A | 7/1996 | Tuttle et al. | 375/200 |
| 5,541,589 A | 7/1996 | Delaney | 340/870.02 |
| 5,544,036 A | 8/1996 | Brown, Jr. et al. | 364/145 |
| 5,546,424 A | 8/1996 | Miyake | 375/206 |
| 5,548,527 A | 8/1996 | Hemminger et al. | 364/492 |
| 5,548,633 A | 8/1996 | Kujawa et al. | 379/93 |
| 5,553,094 A | 9/1996 | Johnson et al. | 375/200 |
| 5,555,508 A | 9/1996 | Munday et al. | 364/492 |
| 5,559,870 A | 9/1996 | Patton et al. | 379/107 |
| 5,566,332 A | 10/1996 | Adair et al. | 395/600 |
| 5,572,438 A | 11/1996 | Ehlers et al. | 364/492 |
| 5,590,179 A | 12/1996 | Shincovich et al. | 379/107 |
| 5,592,470 A | 1/1997 | Rudrapatna et al. | 370/320 |
| 5,594,740 A | 1/1997 | LaDue | 379/59 |
| 5,602,744 A | 2/1997 | Meek et al. | 364/464.22 |
| 5,617,084 A | 4/1997 | Sears | 331/176 |
| 5,619,192 A | 4/1997 | Ayala | 340/870.02 |
| 5,619,685 A | 4/1997 | Schiavone | 395/500 |
| 5,621,629 A | 4/1997 | Hemminer et al. | 363/56 |
| 5,627,759 A | 5/1997 | Bearden et al. | 364/483 |
| 5,631,636 A | 5/1997 | Bane | 340/825.69 |
| 5,640,679 A | 6/1997 | Lundqvist et al. | 455/33.2 |
| 5,659,300 A | 8/1997 | Dresselhuys et al. | 340/870.02 |
| 5,668,803 A | 9/1997 | Tymes et al. | 370/312 |
| 5,668,828 A | 9/1997 | Sanderford, Jr. et al. | 375/223 |
| 5,673,252 A | 9/1997 | Johnson et al. | 370/449 |
| 5,684,472 A | 11/1997 | Bane | 340/870.02 |
| 5,684,799 A | 11/1997 | Bigham et al. | 370/397 |
| 5,691,715 A | 11/1997 | Ouellette | 340/870.09 |
| 5,692,180 A | 11/1997 | Lee | 395/610 |
| 5,696,501 A | 12/1997 | Ouellette et al. | 340/870.02 |
| 5,696,765 A | 12/1997 | Safadi | 370/436 |
| 5,696,903 A | 12/1997 | Mahany | 395/200.58 |
| 5,699,276 A | 12/1997 | Roos | 364/514 A |
| 5,714,931 A | 2/1998 | Petite et al. | 340/539 |
| 5,715,390 A | 2/1998 | Hoffman et al. | 395/188.01 |
| 5,717,604 A | 2/1998 | Wiggins | 364/514 C |
| 5,719,564 A | 2/1998 | Sears | 340/870.02 |
| 5,744,657 A | 4/1998 | Webster | 570/150 |
| 5,745,901 A | 4/1998 | Entner et al. | 707/103 |
| 5,748,104 A | 5/1998 | Argyroudis et al. | 340/870.11 |
| 5,748,619 A | 5/1998 | Meier | 370/278 |
| 5,751,914 A | 5/1998 | Coley et al. | 395/51 |
| 5,751,961 A | 5/1998 | Smyk | 395/200.47 |
| 5,754,772 A | 5/1998 | Leaf | 395/200.33 |
| 5,754,830 A | 5/1998 | Butts et al. | 395/500 |
| 5,757,783 A | 5/1998 | Eng et al. | 370/315 |
| 5,764,155 A | 6/1998 | Kertesz et al. | 340/825.08 |
| 5,768,148 A | 6/1998 | Murphy et al. | 364/492 |
| 5,778,368 A | 7/1998 | Hogan et al. | 707/10 |
| 5,787,437 A | 7/1998 | Potterveld et al. | 707/103 |
| 5,790,789 A | 8/1998 | Suarez | 395/200.32 |
| 5,790,809 A | 8/1998 | Holmes | 395/200.58 |
| 5,801,643 A | 9/1998 | Williams et al. | 340/870.02 |
| 5,805,712 A | 9/1998 | Davis | 380/50 |
| 5,808,558 A | 9/1998 | Meek et al. | 340/870.01 |
| 5,809,059 A | 9/1998 | Souissi et al. | 375/202 |
| 5,822,521 A | 10/1998 | Gartner et al. | 395/200.6 |
| 5,850,187 A | 12/1998 | Carrender et al. | 340/825.54 |
| 5,862,391 A | 1/1999 | Salas et al. | 395/750.01 |
| 5,872,774 A | 2/1999 | Wheatley, III et al. | 370/335 |
| 5,874,903 A | 2/1999 | Shuey et al. | 340/870.02 |
| 5,875,183 A | 2/1999 | Nitadori | 370/328 |
| 5,875,402 A | 2/1999 | Yamawaki | 455/502 |
| 5,875,415 A | 2/1999 | Lieb et al. | 702/122 |
| 5,884,103 A | 3/1999 | Terho et al. | 395/892 |
| 5,884,184 A | 3/1999 | Sheffer | 455/521 |
| 5,892,758 A | 4/1999 | Argyroudis | 370/335 |
| 5,896,382 A | 4/1999 | Davis et al. | 370/401 |
| 5,897,607 A | 4/1999 | Jenney et al. | 702/62 |
| 5,898,387 A | 4/1999 | Davis et al. | 340/870.02 |
| 5,907,540 A | 5/1999 | Hayashi | 370/315 |
| 5,910,799 A | 6/1999 | Carpenter et al. | 345/333 |
| 5,923,269 A | 7/1999 | Shuey et al. | 340/870.02 |
| 5,926,103 A | 7/1999 | Petite | 340/825.19 |
| 5,926,531 A | 7/1999 | Petite | 379/144 |
| 5,943,375 A | 8/1999 | Veintimilla | 375/355 |
| 5,944,842 A | 8/1999 | Propp et al. | 714/701 |
| 5,959,550 A | 9/1999 | Giles | 340/870.02 |
| 5,960,074 A | 9/1999 | Clark | 379/310 |
| 5,960,214 A | 9/1999 | Sharpe, Jr. et al. | 395/835 |
| 5,963,146 A | 10/1999 | Johnson et al. | 340/870.1 |
| 5,970,490 A | 10/1999 | Morgenstern | 707/10 |
| 5,974,236 A | 10/1999 | Sherman | 395/200.51 |
| 5,986,574 A | 11/1999 | Colton | 340/870.02 |
| 6,000,034 A | 12/1999 | Lightbody et al. | 713/202 |
| 6,028,522 A | 2/2000 | Petite | 340/641 |
| 6,034,988 A | 3/2000 | VanderMey et al. | 375/202 |
| 6,035,201 A | 3/2000 | Whitehead | 455/455 |
| 6,041,056 A | 3/2000 | Bigham et al. | 370/395 |
| 6,041,506 A | 3/2000 | Iwao | 30/443 |
| 6,049,840 A | 4/2000 | Shibuya et al. | 710/5 |
| 6,061,604 A | 5/2000 | Russ et al. | 700/90 |
| 6,067,029 A | 5/2000 | Durston | 340/870.03 |
| 6,073,169 A | 6/2000 | Shuey et al. | 709/217 |
| 6,073,174 A | 6/2000 | Montgomerie et al. | 709/224 |
| 6,078,251 A | 6/2000 | Landt et al. | 340/10.41 |
| 6,078,909 A | 6/2000 | Knutson | 705/59 |
| 6,088,659 A | 7/2000 | Kelley et al. | 702/62 |
| 6,088,749 A | 7/2000 | Hebert et al. | 710/105 |
| 6,091,758 A | 7/2000 | Ciccone et al. | 375/132 |
| 6,100,817 A | 8/2000 | Mason, Jr. et al. | 340/870.02 |
| 6,112,192 A | 8/2000 | Capek | 705/59 |
| 6,126,673 A | 10/2000 | Kim et al. | 606/200 |
| 6,128,276 A | 10/2000 | Agee | 370/288 |
| 6,137,423 A | 10/2000 | Glorioso et al. | 340/870.02 |
| 6,138,180 A | 10/2000 | Zegelin | 710/11 |
| 6,138,196 A | 10/2000 | Takayama et al. | 710/105 |
| 6,150,955 A | 11/2000 | Tracy et al. | 340/870.02 |
| 6,154,487 A | 11/2000 | Murai et al. | 375/150 |
| 6,160,933 A | 12/2000 | Laude | 385/31 |
| 6,160,993 A | 12/2000 | Wilson | 455/12.1 |
| 6,172,616 B1 | 1/2001 | Johnson et al. | 340/870.12 |
| 6,181,257 B1 * | 1/2001 | Meek et al. | 340/870.01 |
| 6,199,068 B1 | 3/2001 | Carpenter | 707/100 |
| 6,208,266 B1 | 3/2001 | Lyons et al. | 340/870.02 |
| 6,218,953 B1 | 4/2001 | Petite | 340/641 |
| 6,233,327 B1 | 5/2001 | Petite | 379/155 |
| 6,246,677 B1 | 6/2001 | Nap et al. | 370/346 |
| 6,249,516 B1 | 6/2001 | Brownrigg et al. | 370/338 |
| 6,252,883 B1 | 6/2001 | Schweickart et al. | 370/441 |
| 6,333,975 B1 | 12/2001 | Brunn et al. | 379/106.03 |
| 6,363,057 B1 | 3/2002 | Ardalan et al. | 370/252 |
| 6,393,341 B1 | 5/2002 | Lawrence et al. | 700/286 |
| 6,396,839 B1 | 5/2002 | Ardalan et al. | 370/401 |
| 6,430,268 B1 | 8/2002 | Petite | 379/39 |
| 6,437,692 B1 | 8/2002 | Petite et al. | 340/540 |
| 6,446,192 B1 | 9/2002 | Narasimhan et al. | 712/29 |
| 6,643,278 B1 | 11/2003 | Panasik et al. | 370/330 |
| 6,684,245 B1 | 1/2004 | Shuey et al. | 709/223 |
| 6,751,563 B2 | 6/2004 | Spanier et al. | 702/61 |
| 6,867,707 B1 | 3/2005 | Kelley et al. | 340/870.02 |
| 2001/0002210 A1 | 5/2001 | Petite | 379/155 |
| 2001/0024163 A1 | 9/2001 | Petite | 340/628 |

| | | | | |
|---|---|---|---|---|
| 2002/0012323 | A1 | 1/2002 | Petite et al. | 370/252 |
| 2002/0013679 | A1 | 1/2002 | Petite | 702/188 |
| 2002/0019712 | A1 | 2/2002 | Petite et al. | 702/61 |
| 2002/0019725 | A1 | 2/2002 | Petite | 702/188 |
| 2002/0027504 | A1 | 3/2002 | Davis et al. | 340/540 |
| 2002/0031101 | A1 | 3/2002 | Petite et al. | 370/310 |
| 2002/0125998 | A1 | 9/2002 | Petite et al. | 340/286.01 |
| 2002/0145537 | A1 | 10/2002 | Mueller et al. | 340/870.02 |
| 2002/0169643 | A1 | 11/2002 | Petite et al. | 705/5 |
| 2003/0036810 | A1 | 2/2003 | Petite | 700/9 |
| 2003/0036822 | A1 | 2/2003 | Davis et al. | 700/295 |
| 2003/0123442 | A1 | 7/2003 | Drucker et al. | 370/392 |
| 2004/0001008 | A1 | 1/2004 | Shuey et al. | 340/870.02 |
| 2004/0113810 | A1 | 6/2004 | Mason, Jr. et al. | 340/870.02 |
| 2005/0184881 | A1 | 8/2005 | Dusenberry et al. | 340/870.02 |
| 2005/0270173 | A1 | 12/2005 | Boaz | 340/870.02 |

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |
| GB | 2 118 340 A | 10/1983 |
| GB | 2 157 448 A | 10/1985 |
| GB | 2 186 404 A | 8/1987 |
| GB | 02 222 898 A | 3/1990 |
| GB | 2 237 910 A | 5/1991 |
| JP | 59-229949 | 12/1984 |
| JP | 02-67967 A | 3/1990 |
| JP | 4290593 A | 10/1992 |
| JP | 05-260569 | 10/1993 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |

OTHER PUBLICATIONS

Markwalter, Brian et al., "CEBus Network Layer Description", *IEEE*, 1989, 571-575.

Newtown, Harry, *Newton's Telecom Dictionary*, Flatiron Publishing, Inc., *10th Ed.*, 1996, LAN (1 of 1): Cebus Overview (1-3): Cebus Industry Council (1 of 1).

Newtown, Harry, *Newton's Telecom Dictionary*, 10th Edition, 1996, 243.

International Search Report issued in International Application No. PCT/US98/11170 Date of Mailing: Oct. 7, 1998.

International Search Report issued in International Application No. PCT/US98/19034 Date of Mailing: Feb. 1, 1999.

Internet Printout, http://www.ram.com BellSouth Wireless Data—Paging, Mobitex, Network, Business, Sep. 23, 1998:—Mobitex®: The Heart of Every BellSouth Solution—Mobitex Features and Services: RAM Mobile Data White Paper, Feb. 1997—Narrowband PCS Technologies: What are the Options?: RAM Mobile Data White Paper, Nov. 1997—The Inherent Security of Data Over Mobitex Wireless Packet Data Networks, A RAM Mobile Data White Paper, Oct. 1995—Comparative Analysis of Coverage and Performance: RAM & Ardis, 1998.

Internet Printout, http://www.ardis.com "Ardis Two-Way, Wireless Data Communications," Ardis, Sep. 23, 1998.

Internet Printout, http://ww.ardis.com/RADIO "An Overview of Radio Coverage," Sep. 29, 1998 "Radio Propagation," Sep. 29, 1998 "Factors Affecting Ardis Coverage," Sep. 29, 1998 "The Ardis Network Compared to Other Systems," Sep. 29, 1998.

Internet Printout, http://www.ardis.com/RADIO "Radio Coverage," Sep. 29, 1998 "Glossary of Terms," Sep. 29, 1998 "Radio Propagation in Free Space," Sep. 29, 1998 "Real World Propagation Variations," Sep. 29, 1998 "Probability of Reception vs. Calculation," Sep. 29, 1998.

"MV-90 Read Only System" UTS Software Solutions For Utility Customers. (No Date). (No Page Numbers or Pages).

Rappaport, T. S., "Wireless Communications, Principles and Practice," Prentice Hall PTR, 1996, pp. 410-413.

Brochure: TRF6900 Single-Chip RF Transceiver, Texas Instrument, 2001 ©.

Corcoran, P.M. et al., "CEBus Network Access via the World-Wide-Web", *International Conference on Consumer Electronics*, Jun. 5-7, 1996, 236-237.

Corcoran, P.M. et al., "Browser-Style Interfaces to a Home Automation Network", *IEEE Trans. On Consumer Electronics*, Nov. 1, 1997, 43(4), 1063-1069.

Norenkov, et al., *Telecommunication Technologies and Networks, Moscow Bauman Technical School*, 1988, (Signed for publication on Dec. 10, 1997), pp. 116-118, 80-87 [1] English Language Abstract Provided.

Brownrigg, E. Ph.D., "Developing the Information Superhighway Issues for Libraries", *Library Perspectives on NREN*, The National Research and Education Network, 1990, 55-63.

Brownrigg, E.B., "The Internet as an External Economy: The Emergence of the Invisible Hand", *Library Administration and Management*, 1991, 95-97.

Frankel, M.S., "Packet Radios Provide Link for Distributed, Survivable C3 in Post-Attack Scenarios", *MSN*, Jun. 1983, 80-108.

Gower, N. et al., "Congestion Control Using Pacing in a Packet Radio Network", *IEEE Military Communications Conference*, 1982, 1, 23.1-1, 23-1-6.

Jubin, J., "Current Packet Radio Networks Protocols", *IEEE Infocom Proceedings*, 1985, 86-92.

Kahn, R.E., "The Organization of Computer Resources into a Packet Radio Network", *IEEE Transactions on Communications*, 1977, 25(1), 169-178.

Kahn, R.E., et al., "Advances in Packet Radio Technology", *proceedings of the IEEE*, 1978, 66(11), 1468-1496.

Lauer, G. et al., "Survivable Protocols for Large Scale Packet Radio Networks", *IEEE Global Telecommunications Conference*, 1984, 468-471.

Lynch, C.A. et al., "Electronic Publishing, Electronic Imaging, and Document Delivery", *Electronic Imaging, International Electronic Imaging Exposition & Conference*, 1986, 662-667.

Lynch, C.A. et al., "The Telecommunications Landscape", 1986, 7 pages.

Lynch, C.A. et al., "Routing, Repeating, Power Control and Directional Techniques", *Packet Radio Networks*, Architectures, Protocols, Technologies and Applications, 1987, Ch 5, 105-129, 259-274.

MacGregor, W. et al., "Multiple Control Stations in Packet Radio Networks", *IEEE Military Communications Conference*, 1982, 10.3-1-10.3-5.

Shachan, N. et al., "A Packet Radio Network for Library Automation", *IEEE Military Communications Conference*, 1987, 2, 21.3.1-21.3.7.

Shacham, N. et al., "Future Directions in Packet Radio Technology", *IEEE Infocom Proceedings*, 1985, 93-98.

Westcott, J.A., "Issues in Distributed Routing for Mobile Packet Radio Networks", *IEEE*, 1982, 233-238.

Westcott, J. et al., "A Distributed Routing Design for a Broadcast Environment", *IEEE Military Communications Conference*, 1982, 10.4-1-10.4-5.

"Packet Radio: Applications for Libraries in Developing Countries", *UDT Series on Data Communication Technologies and Standards for Libraries*, 1993, Ch 1-6, 87 pages.

\* cited by examiner

MULTIPURPOSE INTERFACE FOR AN AUTOMATED METER READING DEVICE

BACKGROUND OF THE INVENTION

A wireless network may be employed to transmit data from a number of remote meters to a collection device. An automated meter reading (AMR) device may be placed at or near each of the meters to read meter data from the meters and then transmit the meter data over the wireless network to the collection device or an intermittent relay device. To reduce costs and to meet targeted operational life expectancies, these AMR devices may often be transmit only battery powered devices. At a minimum, the AMR devices must have an electrical connection to the meters that they are reading. The AMR devices may often operate in harsh environments in which they are exposed to natural elements which can easily damage the interior circuitry of the devices. For example, AMR devices for water meters may often be located in the harsh underground environment of a water pit. Thus, it is desirable to limit the number of electrical connections to and from the AMR devices, as such connections may provide a potential path of exposure to natural elements.

A limitation of conventional AMR devices is that the AMR devices may include multiple electrical connections, thereby providing multiple potential paths of exposure to natural elements. For example, conventional AMR devices may include different electrical connections for data communication with a meter, supplying power to a meter, receiving programming information from a programming device, and possibly other connections as well. Any one of these multiple connections may be responsible for causing extensive damage to an AMR device. In some circumstances, an AMR device may have an attached radio receiver that provides the communications path required for programming and test. While the radio enables communications with the device without the negative aspects of a secondary direct connection, the use of such radio receivers presents other drawbacks. In particular, such radio receivers raise the cost and complexity of manufacturing of the AMR devices.

In addition to operating in harsh environments, AMR devices may also operate in connection with a wide variety of different types of meters. For example, common types of water meters may include an absolute encoder with synchronous serial operation, an absolute encoder with asynchronous serial operation, a reed switch pulse register, a generator remote register, and possibly other types of meters as well. Another limitation of conventional AMR devices is that they may only be manufactured to operate in connection with a particular type of meter. This means that multiple types of AMR devices may need to be manufactured and obtained for operation in a wireless network with multiple types of meters. Also, this means that it may not be possible to switch meter types without first switching AMR device types, thereby creating an inconvenience and a potential added expense of obtaining a new AMR device.

SUMMARY OF THE INVENTION

An improved automated meter reading (AMR) device includes only a single electrical connection rather than multiple electrical connections, thereby reducing potential paths of exposure to natural elements. The AMR device monitors the single electrical connection to detect when a programming device is connected to the AMR device. When such a programming device is connected, the AMR device operates in a slave mode that enables the AMR device to be configured for interacting with a particular type of meter. The slave mode may also enable testing of various features of the AMR device such as, for example, its data transmitting capabilities. When the AMR device is not connected to a programming device, the AMR device operates in a master mode that enables the AMR device to interact with a connected meter in accordance with the AMR device's configuration.

The AMR device can be configured and reconfigured any number of times for any number of different meter types. The AMR device can be configured to interact with a number of different types of meters. In particular, depending on the type of meter for which it is being configured, the AMR device can be programmed to receive data, provide voltage supplies, and provide clock inputs over different connection lines within the single electrical connection. The AMR device can be configured to provide a number of different voltage levels to a connected meter device. The AMR device can also be configured to convert a received voltage level to a desired transmission voltage level. The AMR device can also be configured to transmit and receive data in a number of different protocols and to convert a received data protocol to a desired transmission data protocol.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary systems and methods for gathering meter data are described below with reference to FIGS. 1-4. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate with each other. A collector is operable to automatically identify and register meters for communication with the collector. When a meter is installed, the meter registers with a collector that can provide a communication path to the meter. The collectors receive and compile metering data from a plurality of meter devices via wireless communications. A communications server communicates with the collectors to retrieve the compiled meter data.

Figure 1:
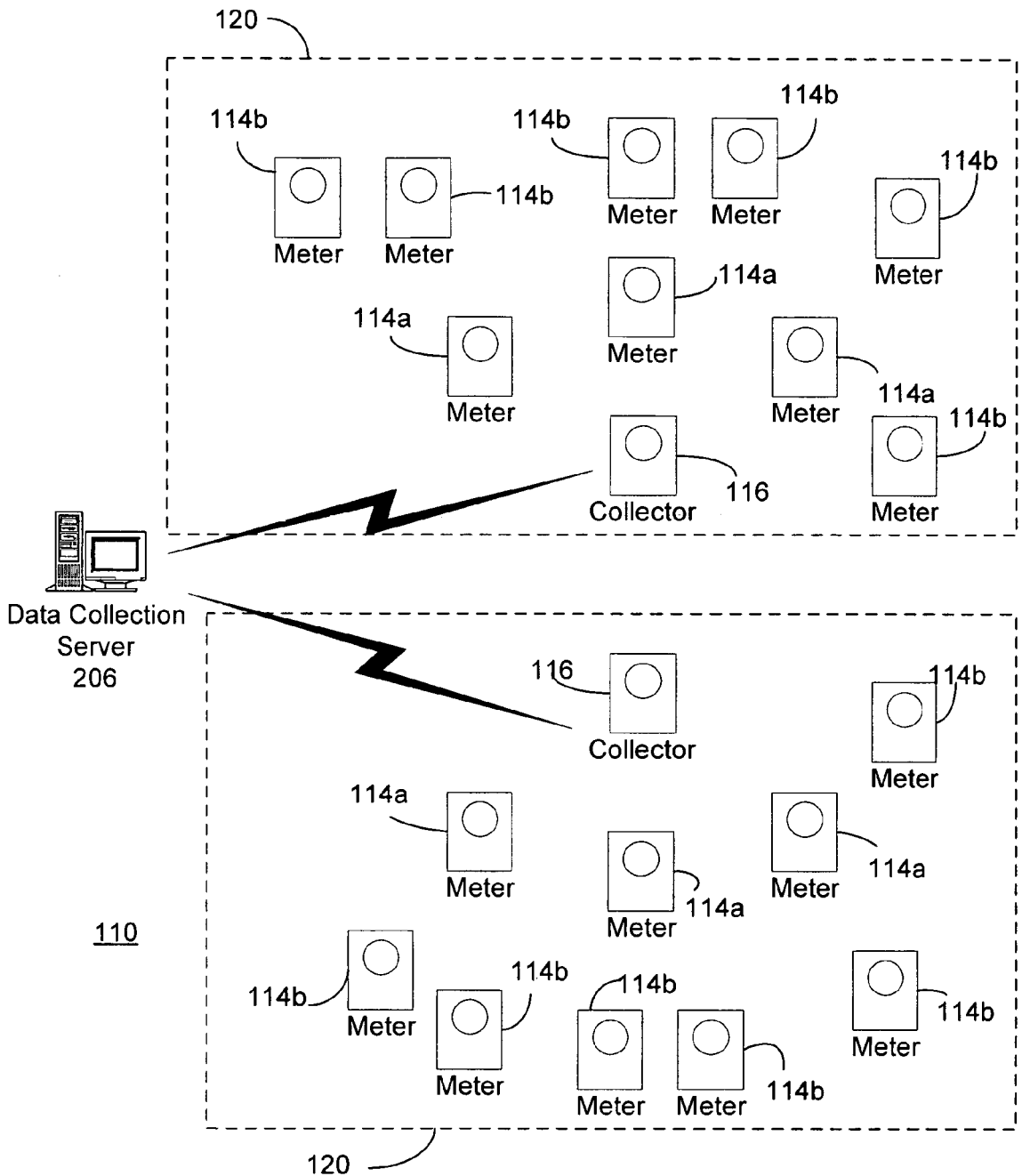
FIG. 1 is a diagram of a wireless system for collecting data from remote devices.

FIG. 1 provides a diagram of an exemplary metering system 110. System 110 comprises a plurality of meters 114, which are operable to sense and record usage of a service or commodity such as, for example, electricity, water, or gas. Meters 114 may be located at customer premises such as, for example, a home or place of business. Meters 114 comprise an antenna and are operable to transmit data, including service usage data, wirelessly. Meters 114 may be further operable to receive data wirelessly as well. In an illustrative embodiment, meters 114 may be, for example, electrical meters manufactured by Elster Electricity, LLC.

System 110 further comprises collectors 116. Collectors 116 are also meters operable to detect and record usage of a service or commodity such as, for example, electricity, water, or gas. Collectors 116 comprise an antenna and are operable to send and receive data wirelessly. In particular, collectors 116 are operable to send data to and receive data from meters 114. In an illustrative embodiment, collectors 116 may be, for example, an electrical meter manufactured by Elster Electricity, LLC.

A collector 116 and the meters 114 for which it is configured to receive meter data define a subnet/LAN 120 of system 110. As used herein, meters 114 and collectors 116 maybe considered as nodes in the subnet 120. For each subnet/LAN 120, data is collected at collector 116 and periodically transmitted to a data collection server 206. The data collection server 206 stores the data for analysis and preparation of bills. The data collection server 206 may be a specially programmed general purpose computing system and may communicate with collectors 116 wirelessly or via a wire line connection such as, for example, a dial-up telephone connection or fixed wire network.

Generally, collector 116 and meters 114 communicate with and amongst one another using any one of several robust wireless techniques such as, for example, frequency hopping spread spectrum (FHSS) and direct sequence spread spectrum (DSSS). As illustrated, meters 114a are "first level" meters that communicate with collector 116, whereas meters 114b are higher level meters that communicate with other meters in the network that forward information to the collector 116.

Figure 2:
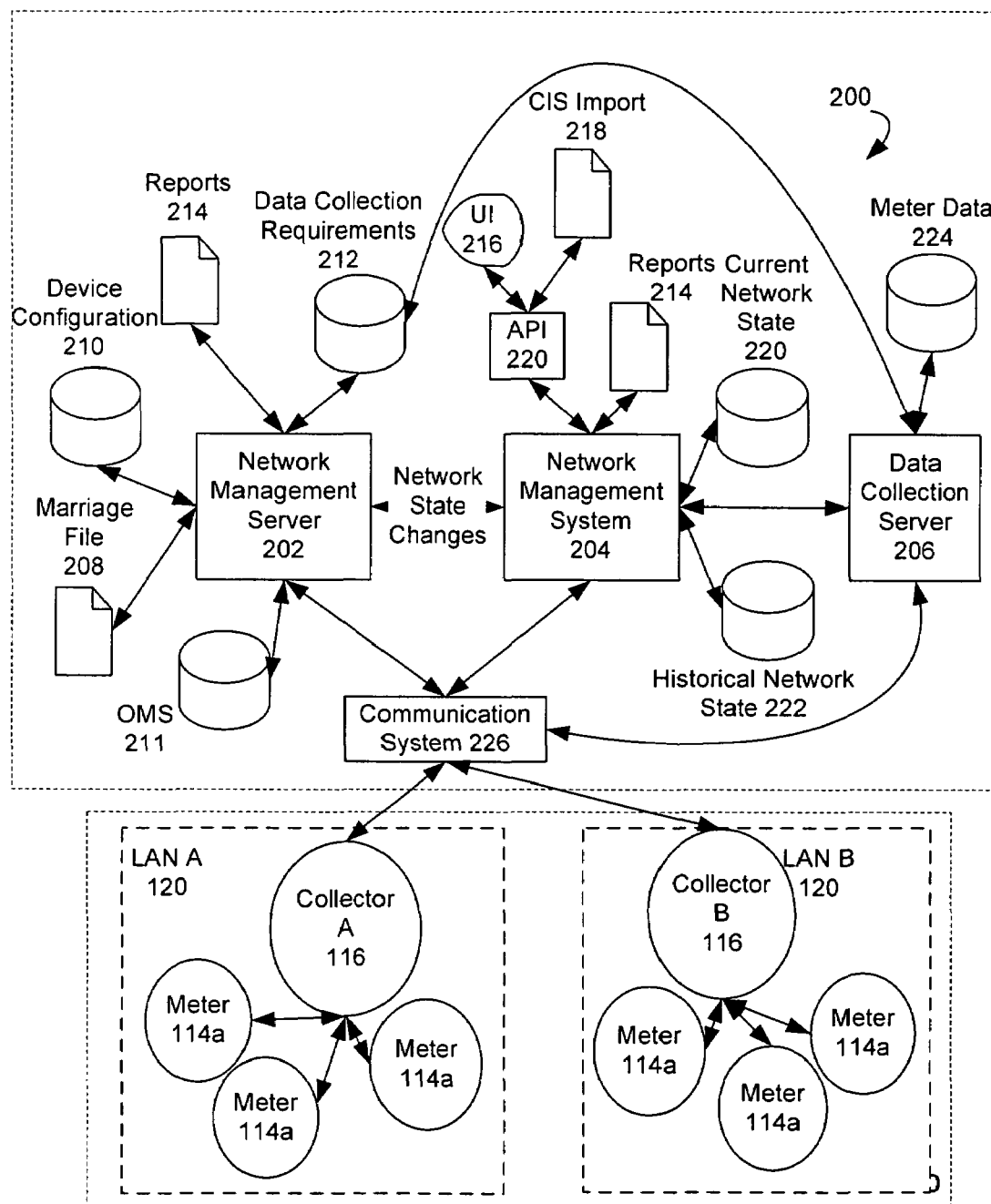
FIG. 2 expands upon the diagram of FIG. 1 and illustrates a system in which the present invention is embodied.

Referring now to FIG. 2, there is illustrated a system 200 in which the present invention may be embodied. The system 200 includes a network management server (NMS)/metering automation server (MAS) 202 (the two terms are used interchangeably herein), a network management system (NMS) 204 and a data collection server 206 that together manage one or more subnets/LANs 120 and their constituent nodes. The NMS 204 tracks changes in network state, such as new nodes registering/unregistering with the system 200, node communication paths changing, etc. This information is collected for each subnet/LAN 120 and are detected and forwarded to the network management server 202 and data collection server 206.

In accordance with an aspect of the invention, communication between nodes and the system 200 is accomplished using the LAN ID, however it is preferable for customers to query and communicate with nodes using their own identifier. To this end, a marriage file 208 may be used to correlate a customer serial number, a manufacturer serial number and LAN ID for each node (e.g., meters 114a and collectors 116) in the subnet/LAN 120. A device configuration database 210 stores configuration information regarding the nodes. For example, in the metering system 110, the device configuration database may include data regarding time of use (TOU) switchpoints, etc. for the meters 114a and collectors 116 communicating to the system 200. A data collection requirements database 212 contains information regarding the data to be collected on a per node basis. For example, a user may specify that metering data such as load profile, demand, TOU, etc. is to be collected from particular meter(s) 114a. Reports 214 containing information on the network configuration may be automatically generated or in accordance with a user request.

The network management system (NMS) 204 maintains a database describing the current state of the global fixed network system (current network state 220) and a database describing the historical state of the system (historical network state 222). The current network state 220 contains data regarding current meter to collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may be implemented in accordance with the present invention. In addition, the data collection requirements stored in the database 212 may be set via the user interface 216 or CIS 218.

The data collection server 206 collects data from the nodes (e.g., collectors 116) and stores the data in a database 224. The data includes metering information, such as energy consumption and may be used for billing purposes, etc. by a utility provider.

The network management server 202, network management system 204 and data collection server 206 communicate with the nodes in each subnet/LAN 120 via a communication system 226. The communication system 226 may be a Frequency Hopping Spread Spectrum radio network, a mesh network, a Wi-Fi (802.11) network, a Wi-Max (802.16) network, a land line (POTS) network, etc., or any combination of the above and enables the system 200 to communicate with the metering system 110.

Figure 3:
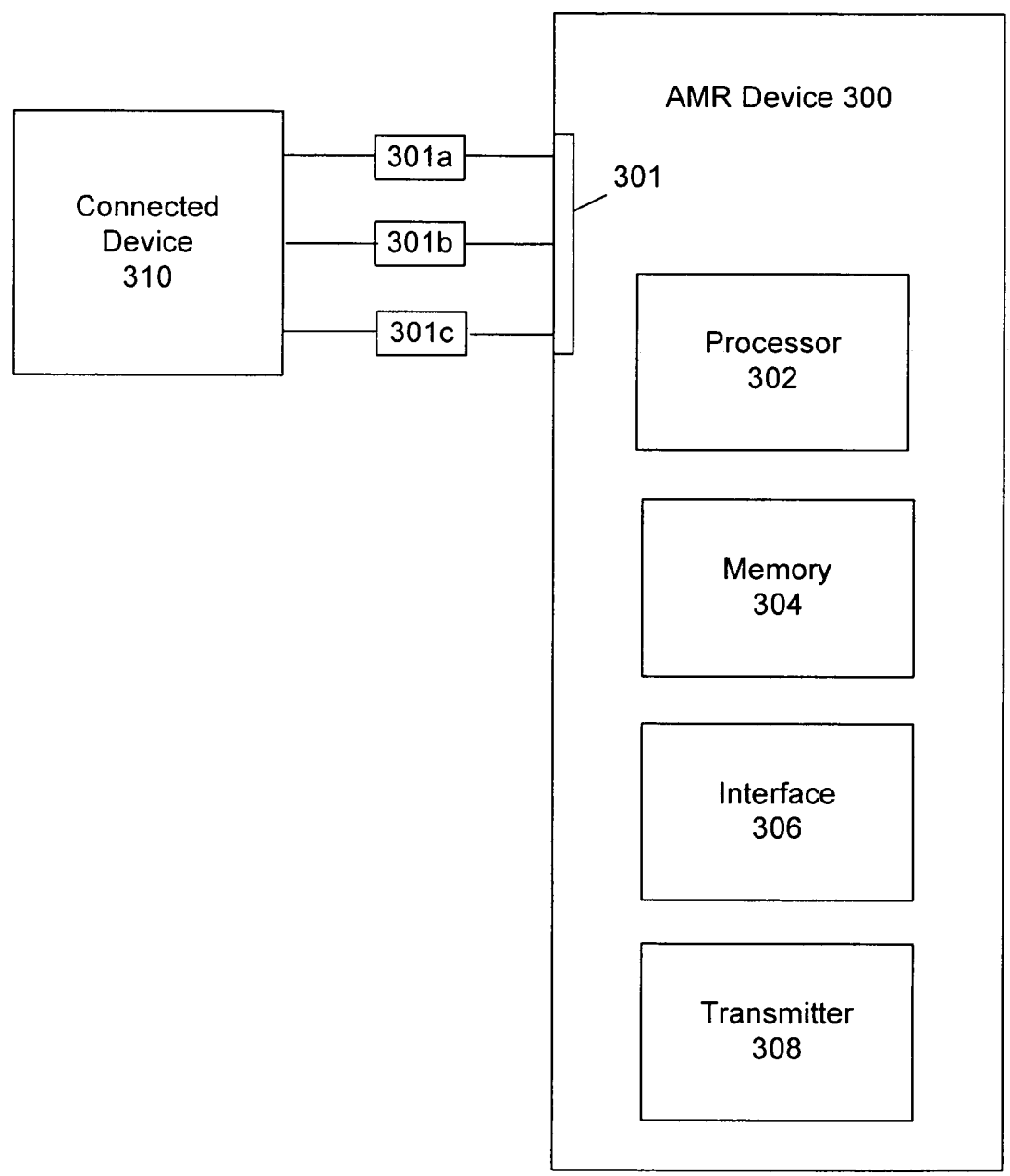
FIG. 3 depicts an exemplary automated meter reading device in accordance with the present invention.

An exemplary automated meter reading (AMR) device 300 in accordance with the present invention is shown in FIG. 3. Unlike conventional AMR devices which may include multiple electrical connections, AMR device 300 includes only a single electrical connection 301, thereby reducing potential paths of exposure to natural elements. Electrical connection 301 is used to connect AMR device 300 to a connected device 310, which may be a programming device, a meter, or possibly another type of device. Although different types of devices may be connected to AMR device 300, only a single connected device 310 may be connected to AMR device 300 at any one time. Electrical connection 301 includes three connection lines 301a, 301b, and 301c. An electrical connection 301 in accordance with the present invention may, however, include more or less than three connection lines. AMR device 301 also includes a processor 302, memory 304, interface 306, and wireless transmitter 306 for transmitting meter data to a collection device or an intermittent relay device.

AMR device 300 monitors electrical connection 301 to detect when AMR device 300 is connected to a programming device. In particular, AMR device 300 may detect a connection to a programming device when two of the three connection lines 301a-c have high logic levels. Upon detecting a connection to a programming device, AMR device interface 306 operates in a slave mode that enables the AMR device 300 to be configured for interacting with a particular type of meter. The slave mode may also enable testing of various features of the AMR device such as, for example, its data transmitting capabilities. When AMR device 300 is not connected to a programming device, AMR device interface 306 operates in a master mode that enables the AMR device 300 to interact with a connected meter in accordance with the AMR device's configuration.

The programming device may be any device that enables AMR device 300 to be programmed for interacting with a particular meter type. The programming device may also be used to program AMR device 300 for transmitting meter data to a collection device and for testing of AMR device 300. The programming device may be a stationary device or a portable device. A portable programming device may be used to configure AMR devices at a number of different remote locations throughout a wireless network.

Memory 304 may be a non-volatile memory. Memory 304 may store a configuration parameter that is programmed by the programming device while AMR device 300 is operating in the slave mode. The configuration parameter may include instructions for using each of connection lines 301a-c. In particular, the configuration parameter may designate each of connection lines 301a-c for receiving data from a meter, providing a voltage supply and/or clock input to the meter, and acting as a common ground.

The configuration parameter may include instructions to generate a number of different voltage supply levels depending upon the type of meter for which AMR device 300 is being configured. In some instances, AMR device 300 may be required to generate a voltage supply that exceeds its own battery voltage. AMR device 300 may generate this increased voltage by, for example, producing the higher voltage and switching it on one of the connection lines in the same manner as it would switch its own battery voltage for lower powered devices. AMR device 300 may also receive a number of different voltage levels depending on the type of device to which it is connected. The configuration parameter may include instructions to convert a received voltage level to a desired transmission voltage level for transmission of meter data. AMR device 300 may also receive a number of different data protocols depending on the type of device to which it is connected. The configuration parameter may include instructions to convert a received data protocol to a desired transmission data protocol for transmission of meter data.

Exemplary configurations for electrical connection 301 with a number of different connected devices are shown in the table below:

| Connected Device Type | Line 301a | Line 301b | Line 301c |
|---|---|---|---|
| Absolute encoder, Asynchronous serial operation | Meter power supply | Asynchronous data receive line | Ground |
| Absolute encoder, Synchronous operation | Meter power supply and clock line | Synchronous data receive line | Ground |
| Reed switch pulse | Voltage source | Consumption switch level sense | Tamper switch level sense |
| Generator remote | No connect | Pulse input | Ground |
| Programming device | Ground | Connection level sense, and asynchronous data receive line | Connection Level Sense, and asynchronous data transmit line |

The first four rows of the above table show configurations for different types of water meters, while the fifth row shows a configuration when the AMR device 300 is connected to a programming device. While the table above shows four exemplary water meter configurations, AMR device 300 may operate in connection with other types of water meters. AMR device 300 may also operate in connection with meters other than water meters such as, for example, gas or electric meters.

For the programming device, line 301a serves as a ground line, line 301b serves as an asynchronous data receive line, and line 301c serves as an asynchronous data transmit line. For the absolute encoders, line 301a serves as a power supply line, line 301b serves as a data receive line, and line 301c serves as a ground line. Furthermore, for the synchronous encoder, line 301a also serves as a clock line to synchronize the data received from the encoder. For the reed switch pulse register, line 301a serves as a voltage source, line 301b serves as a consumption switch level sense, and line 301c serves as a tamper switch level sense. For the generator remote register, line 301a is not connected, line 301b serves as a pulse input line, and line 301c serves as a ground line.

The reed switch pulse register and the generator remote register provide an output a pulse stream that is proportional to water consumption. If AMR device 300 is equipped with a pulse multiplier, AMR device 300 may be programmed to count pulses received from these registers and convert the pulses into engineering units for transmission to a collection device. Alternatively, AMR device may simply transmit the pulse stream, and the collection device may then receive and convert the pulse stream to engineering units. For the switch pulse register, AMR device 300 may be programmed to sense a tamper status on line 301c and to transfer this status information to the collections device.

Figure 4:
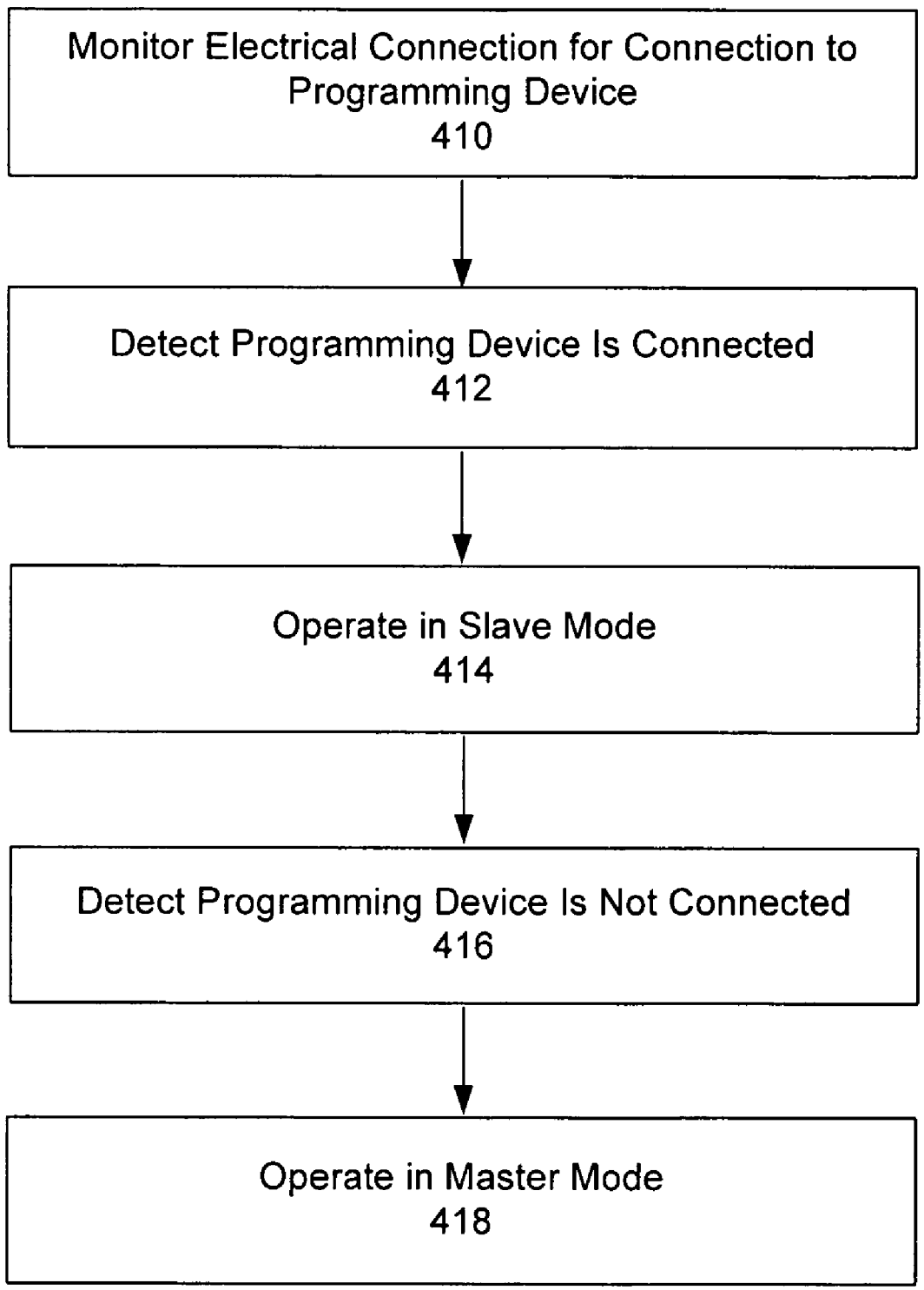
FIG. 4 depicts an exemplary method for interacting with connected devices in accordance with the present invention.

An exemplary method for interacting with connected devices in accordance with the present invention is shown in FIG. 4. At act 410, AMR device 300 monitors electrical connection 301 to detect a connection to a programming device. Electrical connection 301 may include three connection lines 301a-c as depicted in FIG. 3. Electrical connection 301 may alternatively include more or less than three connection lines. The programming device may be any device, portable or stationary, that can program AMR device 300 to interact with a particular type of meter. The programming device may also be used to program AMR device 300 for transmitting meter data to a collection device and for testing AMR device 300.

At act 412, AMR device 300 detects that it is connected to a programming device. AMR device 300 may detect a connected programming device when two of three electrical connection lines 301a-c have a high logic voltage level. At act 414, upon detecting a connection to a programming device, AMR device interface 306 operates in a slave mode that enables AMR device 300 to be configured for interacting with a particular type of meter. The configuration of AMR device 300 is described in detail above with reference to FIG. 3. The slave mode may also enable AMR device 300 to be configured for transmitting data to a collection device and for testing various capabilities of AMR device 300. AMR device 300 may be configured by using the programming device to program a configuration parameter that may be stored within AMR device memory 304.

At act 416, AMR device 300 detects that it is no longer connected to the programming device, and, responsively, at act 418, AMR device interface 306 switches operation from slave mode to master mode. Master mode enables AMR device 300 to interact with a connected meter according to its configuration as programmed by the programming device. As should be appreciated, AMR device 300 may be reconfigured any number of times to interact with any number of different meter types. This enables a single version of AMR device 300 to be built, inventoried, and then distributed for interaction with any number of different meter types. Thus, the method depicted in FIG. 4 may be repeated an unlimited number of times for any single AMR device 300, each time potentially enabling interaction with a different type of meter.

While systems and methods have been described and illustrated with reference to specific embodiments, those skilled in the art will recognize that modification and variations may be made without departing from the principles described above and set forth in the following claims. Accordingly, reference should be made to the following claims as describing the scope of disclosed embodiments.

What is claimed:

1. An automated meter reading device comprising:
   a single electrical connection that is monitored to detect a connection between the automated meter reading device and a programming device; and
   an interface operating in a slave mode when the automated meter reading device is connected to the programming device, the slave mode enabling the automated meter reading device to be programmed with a configuration parameter for interacting with a particular meter type, the interface operating in a master mode when the automated meter reading device is not connected to the programming device, the master mode enabling the automated meter reading device to interact with a connected meter according to the configuration parameter,
   wherein the configuration parameter comprises instructions for providing to the connected meter one of a plurality of different voltage levels producible by the automated meter reading device.

2. The automated meter reading device of claim 1, wherein the single electrical connection comprises three connection lines.

3. The automated meter reading device of claim 2, wherein the connection between the automated meter reading device and the programming device is detected when two of the three connection lines have high logic voltage levels.

4. The automated meter reading device of claim 1, wherein the particular meter type is one of a plurality of different meter types for which the automated meter reading is configurable.

5. The automated meter reading device of claim 1, wherein the slave mode further enables testing of remote data transmitting capabilities of the automated meter reading device.

6. The automated meter reading device of claim 1, wherein the configuration parameter comprises instructions for converting a voltage level received from the connected meter to a desired transmission voltage level.

7. The automated meter reading device of claim 1, wherein the configuration parameter comprises instructions for converting a data protocol received from the connected meter to a desired transmission data protocol.

8. An automated meter reading device comprising:
   a memory that is stores a configuration parameter that is programmable to provide instructions for interacting with any one of a plurality of different meter types; and
   an interface that communicates with a connected meter according to the instructions programmed into the configuration parameter,
   wherein the configuration parameter comprises instructions for converting a voltage level received from the connected meter to a desired transmission voltage level.

9. The automated meter reading device of claim 8, wherein the plurality of different meter types include at least two of an absolute encoder with synchronous serial operation, an absolute encoder with asynchronous serial operation, a reed switch pulse register, and a generator remote register.

10. The automated meter reading device of claim 8, wherein the configuration parameter further comprises instructions for providing to the connected meter one of a plurality of different voltage levels producible by the automated meter reading device.

11. The automated meter reading device of claim 8, wherein the configuration parameter further comprises instructions for converting a data protocol received from the connected meter to a desired transmission data protocol.

12. The automated meter reading device of claim 8, further comprising a single electrical connection for connecting one of the meter device and a programming device for programming the configuration parameter.

13. A processor readable medium having stored thereon instructions for:
   monitoring a single electrical connection to detect when an automated meter reading device is connected to a programming device;
   when the automated meter reading device is connected to the programming device, operating in a slave mode that enables the programming device to program a configuration parameter with instructions for interacting with a particular meter type; and
   when the automated meter reading device is not connected to the programming device, operating in a master mode that enables the automated meter reading device to interact with a connected meter according to the configuration parameter,
   wherein the configuration parameter comprises instructions for providing to the connected meter one of a plurality of different voltage levels producible by the automated meter reading device.

14. The processor readable medium of claim 13, having stored thereon further instructions for detecting that the automated meter reading device is connected to the programming device by detecting a high logic voltage level on two of three connection lines within the single electrical connection.

15. The processor readable medium of claim 13, wherein the configuration parameter comprises instructions for interacting with any one of a plurality of different meter types for which the automated meter reading device is configurable.

16. The processor readable medium of claim 13, wherein the configuration parameter further comprises instructions for converting a voltage level received from the connected meter to a desired transmission voltage level.

17. The processor readable medium of claim 13, wherein the configuration parameter further comprises instructions for converting a data protocol received from the connected meter to a desired transmission data protocol.

18. An automated meter reading device comprising:
   a single electrical connection that is monitored to detect a connection between the automated meter reading device and a programming device; and
   an interface operating in a slave mode when the automated meter reading device is connected to the programming device, the slave mode enabling the automated meter reading device to be programmed with a configuration parameter for interacting with a particular meter type, the interface operating in a master mode when the automated meter reading device is not connected to the programming device, the master mode enabling the automated meter reading device to interact with a connected meter according to the configuration parameter,
   wherein the single electrical connection comprises three connection lines and wherein the connection between the automated meter reading device and the programming device is detected when two of the three connection lines have high logic voltage levels.

19. A processor readable medium having stored thereon instructions for:

monitoring a single electrical connection to detect when an automated meter reading device is connected to a programming device;

when the automated meter reading device is connected to the programming device, operating in a slave mode that enables the programming device to program a configuration parameter with instructions for interacting with a particular meter type; and when the automated meter reading device is not connected to the programming device, operating in a master mode that enables the automated meter reading device to interact with a connected meter according to the configuration parameter, wherein the configuration parameter comprises instructions for converting a voltage level received from the connected meter to a desired transmission voltage level.

20. A processor readable medium having stored thereon instructions for:

monitoring a single electrical connection to detect when an automated meter reading device is connected to a programming device;

when the automated meter reading device is connected to the programming device, operating in a slave mode that enables the programming device to program a configuration parameter with instructions for interacting with a particular meter type;

when the automated meter reading device is not connected to the programming device, operating in a master mode that enables the automated meter reading device to interact with a connected meter according to the configuration parameter; and detecting that the automated meter reading device is connected to the programming device by detecting a high logic voltage level on two of three connection lines within the single electrical connection.

* * * * *